United States Patent [19]
White

[11] Patent Number: 5,924,464
[45] Date of Patent: Jul. 20, 1999

[54] TIRE HAVING FLOW ISOLATING GROOVES

[75] Inventor: Timothy Andrew White, Greer, S.C.

[73] Assignee: Michelin Recherche et Technique, S.A., Switzerland

[21] Appl. No.: 08/623,753

[22] Filed: Mar. 29, 1996

[51] Int. Cl.[6] ............................ B60C 11/12; B60C 11/13; B60C 103/00; B60C 109/00
[52] U.S. Cl. ............................... 152/209.21; 152/209.17; 152/DIG. 3
[58] Field of Search .......................... 152/209 R, 209 D, 152/DIG. 3

[56] References Cited

U.S. PATENT DOCUMENTS

| | | |
|---|---|---|
| D. 366,861 | 2/1996 | Sulkowski . |
| 1,413,190 | 4/1922 | Rapson ................................ 152/209 R |
| 2,104,532 | 1/1938 | Sommer .............................. 152/209 R |
| 2,322,505 | 6/1943 | Bull ..................................... 152/209 R |
| 3,674,077 | 7/1972 | Verdier . |
| 3,971,424 | 7/1976 | Boileau . |
| 3,998,256 | 12/1976 | Verdier . |
| 4,217,942 | 8/1980 | Takigawa et al. . |
| 4,282,915 | 8/1981 | Fontaine . |
| 4,362,201 | 12/1982 | Zinnen et al. . |
| 4,424,844 | 1/1984 | Fontaine . |
| 4,619,300 | 10/1986 | Tokunaga et al. . |
| 4,664,166 | 5/1987 | Benisti ................................ 152/209 R |
| 4,703,787 | 11/1987 | Ghilardi .............................. 152/209 R |
| 4,723,584 | 2/1988 | Yamaguchi et al. ............... 152/DIG. 3 |
| 4,854,358 | 8/1989 | Takeuchi . |
| 4,856,571 | 8/1989 | Collette et al. ..................... 152/209 R |
| 4,945,966 | 8/1990 | Ogawa . |
| 4,977,942 | 12/1990 | Ochiai . |
| 5,088,536 | 2/1992 | Graas et al. . |
| 5,147,478 | 9/1992 | Nock et al. . |
| 5,287,905 | 2/1994 | Caretta et al. ..................... 152/DIG. 3 |
| 5,318,085 | 6/1994 | Vekselman . |
| 5,327,952 | 7/1994 | Glover et al. . |
| 5,358,022 | 10/1994 | Glover et al. . |
| 5,361,814 | 11/1994 | Covert et al. . |
| 5,386,862 | 2/1995 | Glover et al. . |
| 5,415,215 | 5/1995 | Covert et al. . |
| 5,503,207 | 4/1996 | Ochiai et al. . |

FOREIGN PATENT DOCUMENTS

| | | | |
|---|---|---|---|
| 655071 | 12/1937 | Germany ........................... | 152/209 R |
| 197402 | 8/1990 | Japan ................................. | 152/209 R |
| 338411 | 12/1993 | Japan ................................. | 152/209 D |
| 491139 | 8/1938 | United Kingdom .............. | 152/209 R |
| 1002317 | 8/1965 | United Kingdom .............. | 152/209 R |
| 1407790 | 9/1975 | United Kingdom .............. | 152/209 R |

*Primary Examiner*—Steven D. Maki
*Attorney, Agent, or Firm*—Alan A. Csontos; Robert R. Reed

[57] ABSTRACT

A tire having a decreased percentage of void and superior wear abilities, yet still having improved wet traction ability is disclosed. The improved wet traction ability is enhanced by the flow isolating characteristic of the minor grooves of the tire. By reducing the amount of water flow between the major and minor grooves for a prescribed period during which the major grooves evacuate water away from the tire, there is a reduction in the volume and nature of turbulence due to the intersecting water flows exiting the minor grooves into the major grooves. This reduction of turbulence allows for fluid to be properly channeled away from the contact patch area by their major grooves.

14 Claims, 9 Drawing Sheets

TIRE HAVING FLOW ISOLATING GROOVES

BACKGROUND OF THE INVENTION

Improving the wet traction ability of a tire is an important goal in the tire manufacturing industry. For example, U.S. Pat. Nos. 5,327,952; 5,358,022; and 5,386,862, all to Glover et al., disclose variations on a design for making a pneumatic tire having improved wet traction. In the Glover patents, a deep centrally located circumferential groove, denoted as an annular aqua channel, directs water in combination with transverse groove, from the footprint of the tire to it's shoulder area to prevent hydroplaning. As seen by the large size of the circumferential groove and large number traverse grooves in these patents, there is a large amount of void in these treads, i.e., the ratio of tread to groove. While an increase in void usually improves wet performance, the tread elements of the tire may be scrubbed away at a relatively fast rate. Thus, in a short amount of time, a tire as disclosed in the Glover patents, may soon lose its ability to reliably avoid hydroplaning. Additionally, due to the large number of points at which the transverse grooves intersect the circumferential groove, or aqua channel in the Glover patents, there is a large amount of turbulence, i.e., eddy currents, due to the intersections of different flows having varying flow characteristics such as direction and velocity. The turbulence interferes with the ability of the tire to optimally evacuate the water in the grooves.

Thus, the need exists for a tire having comparatively less void for commensurately better wear, and a decrease in turbulence at the points in which the circumferential and transverse grooves meet, for commensurately better water evacuation.

SUMMARY OF THE INVENTION

It is an object of the invention to provide a tire with improved wet traction ability.

It is a further object of the invention to provide a tire with improved wet traction ability and having a decrease in the void amount of the tire.

It is still further object of the invention to provide a tire with an improved wet traction having a decrease in turbulence at the points at which circumferential and transverse grooves meet, thereby resulting in a decrease in hydrodynamic lift.

It is a still yet a further object of the invention to provide a tire with improved wet traction having a superior wear capabilities.

It is a still yet a further object of the invention to provide a tire with improved wet traction and having a variety of tread configurations.

These and other objects of the invention are achieved by a tire with improved wet traction having, in one aspect thereof, a tread portion; at least one major groove, said at least one major groove extending generally circumferentially around said tread portion; at least one minor groove having a first end intersecting said major groove, said minor groove being narrower than said major groove, said minor groove defined by a void and an exit at said first end, such that when said exit is open, fluid may flow between said void and said major groove and when said exit is closed, fluid flow between said void and said major groove is restricted, whereby rolling said tire against the ground closes said exit.

Additionally, in another aspect thereof, a tire having improved wet traction capability according to the present invention includes a pair of side walls; and a tread having a tread surface for contacting a ground surface during rotation of the tire about its axis. The tread has at least one major groove extending in an overall circumferential direction around the tire and having surfaces recessed radially inwardly form said tread surface such that fluid may flow in a circumferential direction through said major groove throughout contact of said tread surface with a ground surface during rotation of the tire. The tire tread has a first block element and a second block element each forming a portion of said tread surface, said first and second block elements being spaced circumferentially from one another to define therebetween a void portion recessed radially inwardly from said tread surface and laterally spaced from said major groove and a communicating portion for selectively communicating said void portion and said major groove for the flow of fluid therebetween. The communicating portion is disposable in a fluid flow disposition in which fluid may flow between said void portion and said major groove and a restricted disposition in which the flow of fluid between said void portion and said major groove is more restricted than in said water flow disposition of said communicating portion. The first and second block elements are moveable relatively toward one another in the circumferential direction to thereby automatically dispose said communicating portion in said restricted disposition when at least one of said first and second block elements is in ground contact.

DETAILED DESCRIPTION OF THE INVENTION

A tire having improved wet traction and that meets and achieves all the objects of the invention set forth above will now be described with reference to FIGS. 1–10.

Figure 1:
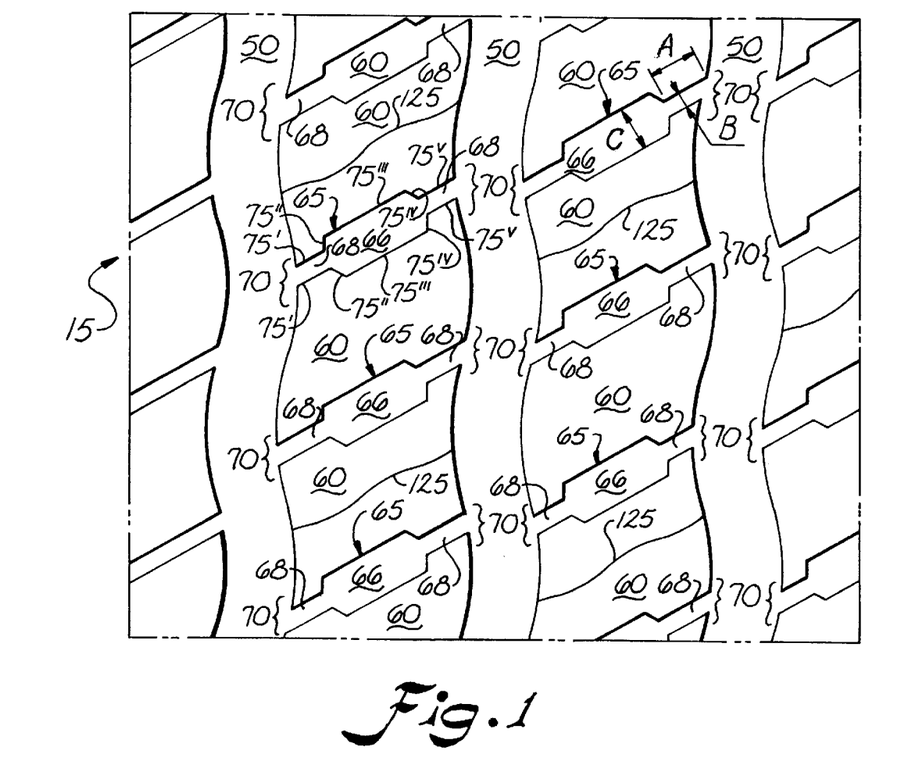
FIG. 1 is a plan view of a portion of one embodiment of a tire having improved wet traction according to the invention.

FIG. 1 is a plan view of a portion of one embodiment of a tire having improved wet traction according to the invention. FIGS. 2A–2F illustrate a portion of another embodiment of a tire having improved wet traction according to the invention, with the tire portion being shown shortly before entry of the portion into contact with a ground surface (see FIGS. 2A and 2D); the tire portion being shown in contact with a ground surface (see FIGS. 2B and 2E); and the tire portion being shown shortly after exiting its contact with a ground surface (see FIGS. 2C and 2F).

In each of the various embodiments of the tires disclosed in the Figures of the drawings, a rubber tread 15 has a raised tread surface for contacting the ground on which the tire will roll and has at least one, but typically a plurality of, major grooves 50 recessed radially inward for the tread surface and extending generally circumferentially thereabout. Major grooves 50 may have curved walls as shown in FIG. 1, parallel co-planar walls, as shown in, for example, the another embodiment of a tire shown in FIGS. 2A, 2B, and 3, or parallel non-co-planar walls, as shown in the additional alternative embodiment of a tire shown in FIGS. 8A, 8B. When the tire is rolling against the ground, water may flow in a circumferential direction through major groove 50. The straighter that major grooves 50 are, i.e., the more they are "see through", the greater the ability of water to flow through major grooves 50.

Rubber tread 15 also has at least one minor groove 65 recessed radially inwardly from the tread surface for directing water or an aqueous mixture such as water and snow or water and ice to the major groove 50 and, additionally, for the carrying of water or snow away from the contact patch in a manner similar to the transport of water by a waterwheel. As with major grooves 50, there will typically be a plurality of minor grooves 65. Minor grooves 65 are also known to those skilled in the art as transverse or lateral grooves. Minor grooves 65 will have at least one end 68 that intersects a major groove 50. The portions of raised tread between major and minor grooves form blocks 60. The surfaces of blocks 60 comprise the raised tread surfaces of the tire. Blocks 60 have conventional sipes 125 therein.

Minor grooves 65 are defined, and blocks 60 are circumferentially spaced apart, by radially inwardly recessed voids 66, which are laterally spaced from major grooves 50, and an at least partially closeable exit 70 at the points where minor grooves 65 intersect major grooves 50. At least partially closeable exit 70 acts as a communicating portion for selectively communicating void 66 and the major grooves 50 for the flow of water therebetween. That is, when, as shown in FIGS. 1, 2F, 7A, 8A, 8C & 10A, at least partially closeable exit 70 is open (water flow disposition), fluid may flow between void 66 and major groove 50. When, as shown in FIGS. 2F, 7B & 7C, partially closeable exit 70 is partially closed (restricted disposition), fluid flow between void 66 and major groove 50 is at least reduced or restricted from the open (water flow) disposition. Due to the flexibility within the rubber making up the tire and blocks 60, themselves, rolling the tire against the ground causes opposing blocks 60 on each side of a minor groove 65 to move relative to one another in the circumferential direction to at least partially close exit 70, placing said communicating portion in the restricted disposition, thereby at least reducing or restricting the amount of flow of fluid between void 66 and major groove 50. When at least partially closeable exit comprises a fully closeable exit, as in, for example, FIGS. 2E, 2F, 8B, 8D & 10B, when fully closeable exit 70 is closed, fluid flow between void 66 and major groove 50 is entirely prevented.

Thus, as seen in the another embodiment of the tire according to the present invention shown in FIGS. 2A–2F, a tire according to the present invention includes a pair of side walls SW and a tread 215 having a tread surface for contacting a ground surface during rotation of the tire about its axis RA. The rubber tread 215 has least one major groove 250 extending in an overall circumferential direction CW around the tire and has surfaces recessed radially inwardly form the tread surface such that fluid may flow in a circumferential direction through the major groove 250 throughout contact of the tread surface with a ground surface GS during rotation of the tire.

Also, the tire includes a first block element 260A and a second block element 260B each forming a portion of the tread surface and spaced circumferentially from one another to define therebetween a void portion 266 recessed radially inwardly from the tread surface and laterally spaced from the major groove. The tire also includes a communicating portion in the form of exit 270 for selectively communicating the void portion 266 and the major groove 250 for the flow of fluid such as water or an aqueous mixture of water, snow, and ice, therebetween.

Figure 2A:
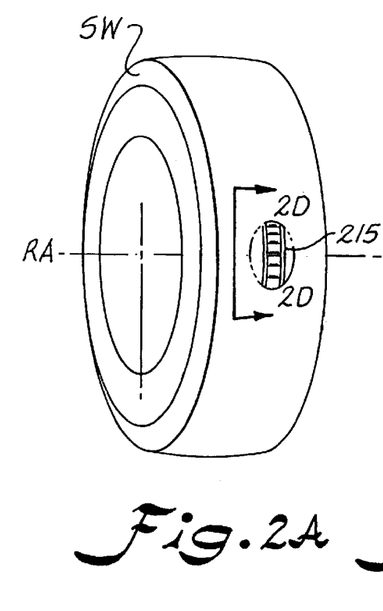
FIG. 2A is a perspective view of a portion of another embodiment of a tire having improved wet traction according to the invention, the tire portion being shown shortly before entry of the portion into contact with a ground surface.

During the rolling of the tire in contact with the ground surface GS, when the portion of the tire comprising the first and second block elements 260A, 260B is out of contact with the ground surface GS, such as, for example, as shown in FIG. 2A, the communicating or exit portion 270 is in a fluid flow disposition in which fluid may flow between the void portion 266 and the major groove 250. Conversely, when the portion of the tire comprising the first and second block elements 260A, 260B is in contact with the ground surface GS, such as, for example, as shown in FIG. 2B, the communicating or exit portion 270 is in a restricted disposition in which the flow of fluid between the void portion 266 and the major groove 250 is more restricted than in the fluid flow disposition of the communicating portion, up to and including completely restricted.

Figure 2B:
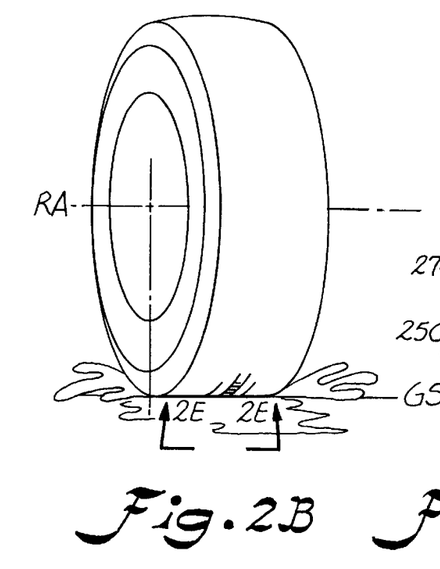
FIG. 2B is a perspective view of the tire portion of the another embodiment of the tire shown in FIG. 2A in the contact patch area in which the tire portion is in contact with a ground surface.
Figures 2C, 2F, 2H:
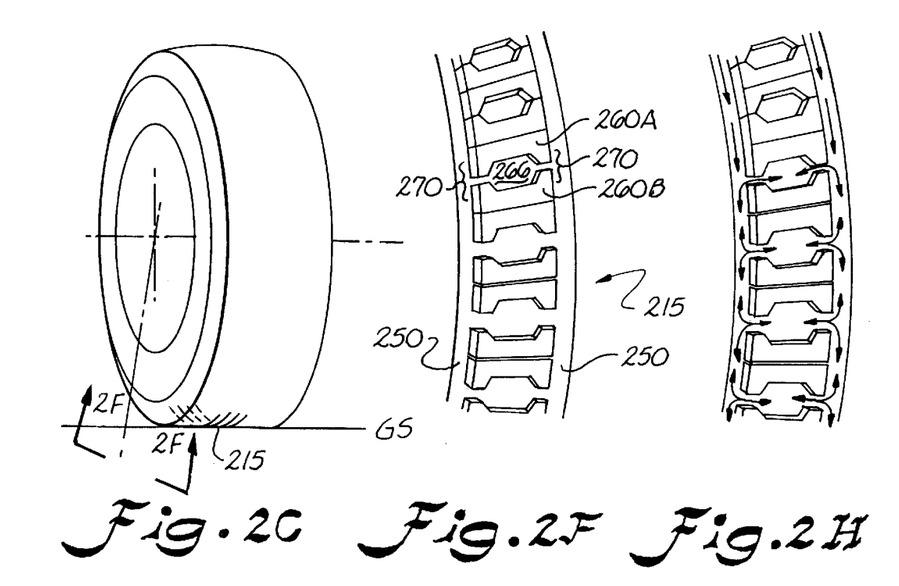
FIG. 2C is a perspective view of the tire portion of the another embodiment of the tire shown in FIG. 2A shortly after exiting the contact patch.
FIG. 2F is a perspective view of the tire portion of the another embodiment of the tire shown in FIG. 2A shortly after exiting the contact patch and showing the flow or prohibition of water within the various grooves of the tire according to the invention.
FIG. 2H is a perspective view of one rib with adjacent major grooves of the tirem of FIG. 2F showing the flow in grooves with exits of minor grooves open, partially restricted and completely restricted.

The fluid restricting action can be seen in FIG. 2B, in which the portion of the tire comprising the first and second block elements 260A, 260B has entered the contact patch and in which it is seen that the first and second block elements 260A, 260B move relatively toward one another in the circumferential direction CW to thereby automatically dispose the communicating or exit portion 270 in the restricted disposition. Thus, the first and second block elements 260A, 260B automatically dispose the communicating or exit portion 270 in the restricted disposition when at least one of the first and second block elements 260A, 260B is in ground contact.

During the period of ground contact of the first and second block elements 260A, 260B, the void 266 of the minor groove 265 is effectively isolated from the adjacent major grooves 250 due to the "pinching" or restricted disposition of the exit portions 270. Thus, it is possible that water or water and particulate mixture which is present in the void 266 at the time at which the exit portion 270 is disposed from its open flow disposition into its completely restricted disposition is retained in the void 266 in a manner analogous to the action of a water wheel bucket scooping and holding a volume of water. If such water or mixture is thus independently retained in the void 266 as the minor groove 265 is rotated through the ground contact position shown in FIGS. 2B, 2E, and 2H and is then evacuated from the void 266 due to centrifugal or other forces as the minor groove 265 moves into the out of ground contact position shown in FIGS. 2C, 2F, and 2I, then it can be seen that the void 266 itself operates to evacuate water from the tread independently of the evacuation of water by the major grooves 250.

Figure 3:
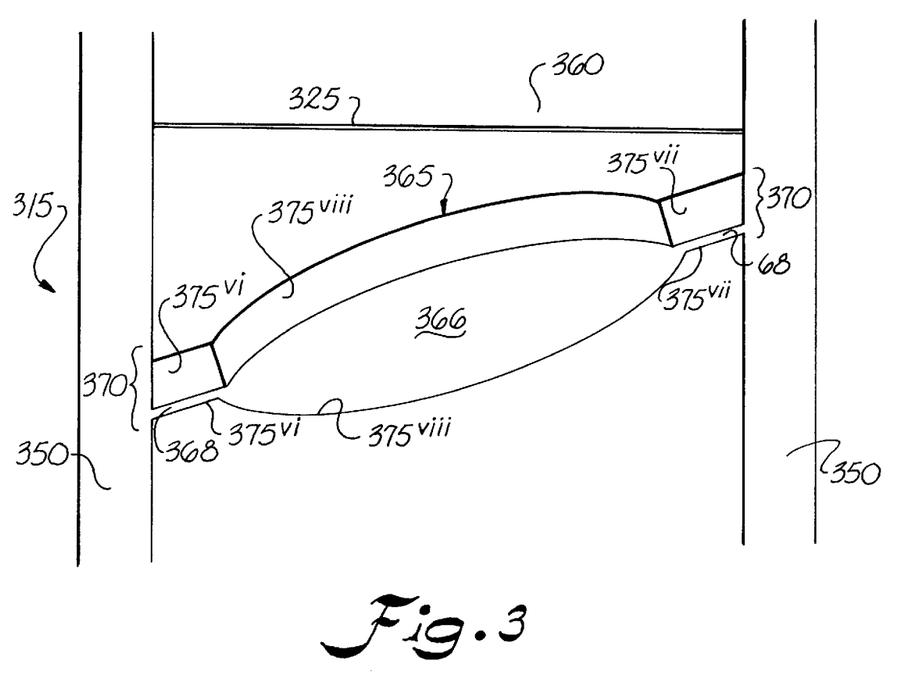
FIG. 3 is a perspective view of a transverse groove of a further embodiment of a tire having improved wet traction according to the invention.

FIG. 3 is a perspective view of a transverse groove of a further embodiment of a tire having improved wet traction according to the invention. A rubber tread 315 has a raised tread surface for contacting the ground on which the tire will roll and has at least one, but typically a plurality of, major grooves 350 recessed radially inward for the tread surface and extending generally circumferentially thereabout. Major grooves 350 may have curved walls as shown, for example, in the different embodiment illustrated in FIG. 1, parallel co-planar walls, as shown in, for example, in FIG. 3, or parallel non-co-planar walls, as shown in the additional alternative embodiment of a tire shown in FIGS. 8A, 8B.

When the tire is rolling against the ground, water may flow in a circumferential direction through major groove 350. The straighter that major grooves 350 are, i.e., the more they are "see through", the greater the ability of water to flow through major grooves 350. Rubber tread 315 also has at least one minor groove 365 recessed radially inwardly from the tread surface for directing water or an aqueous mixture such as water and snow or water and ice to the major groove 350 and, additionally, for the carrying of water or snow away from the contact patch in a manner similar to the transport of water by a waterwheel. As with major grooves 350, there will typically be a plurality of minor grooves 365.

Minor grooves 365 are also known to those skilled in the art as transverse or lateral grooves. Minor grooves 365 will have at least one end 368 that intersects a major groove 350. The portions of raised tread between major and minor grooves form blocks 360. The surfaces of blocks 360 comprise the raised tread surfaces of the tire. Blocks 360 have conventional sipes 325 therein. Minor grooves 365 are defined, and blocks 360 are circumferentially spaced apart, by radially inwardly recessed voids 366, which are laterally spaced from major grooves 350, and an at least partially closeable exit 370 at the points where minor grooves 365 intersect major grooves 350.

At least partially closeable exit 370 acts as a communicating portion for selectively communicating void 366 and the major grooves 350 for the flow of water therebetween. That is, when at least partially closeable exit 370 is open (water flow disposition), fluid may flow between void 366 and major groove 350. When partially closeable exit 370 is partially closed (restricted disposition), fluid flow between void 366 and major groove 350 is at least reduced or restricted from the open (water flow) disposition. Due to the flexibility within the rubber making up the tire and blocks 360, themselves, the rolling of the tire along the ground causes opposing blocks 360 on each side of a minor groove 365 to move relative to one another in the circumferential direction to at least partially close exit 370, placing said communicating portion in the restricted disposition, thereby at least reducing or restricting the amount of flow of fluid between void 366 and major groove 365. When the at least partially closeable exit 370 comprises a fully closeable exit, as in, for example, in the embodiment shown in FIGS. 2G & 2H, when the exit 270 is closed, fluid flow between void 266 and major groove 265 is entirely prevented.

Figure 7A:
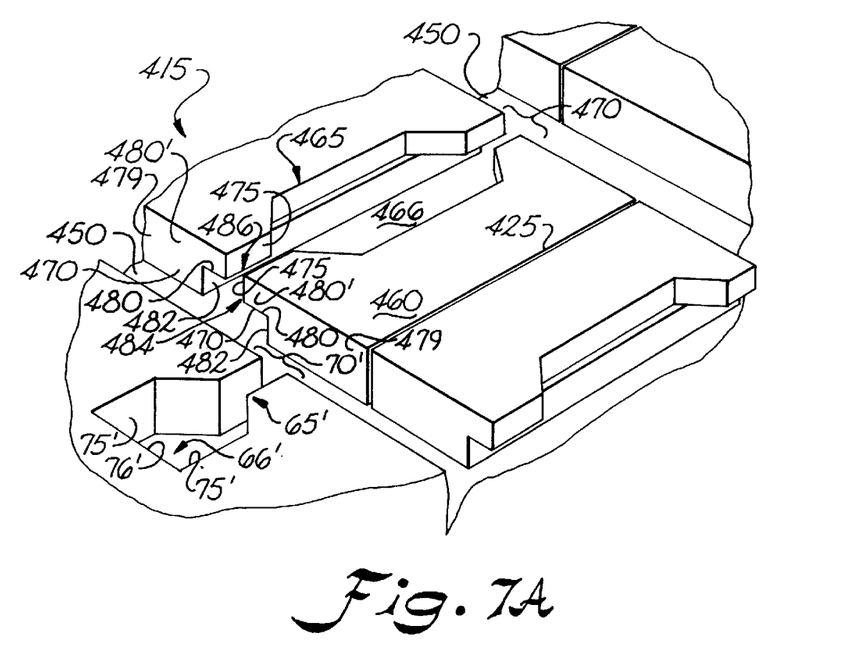
FIG. 7A is a perspective view of a portion of an alternative embodiment of a tire having improved wet traction according to the invention.
Figure 7B:
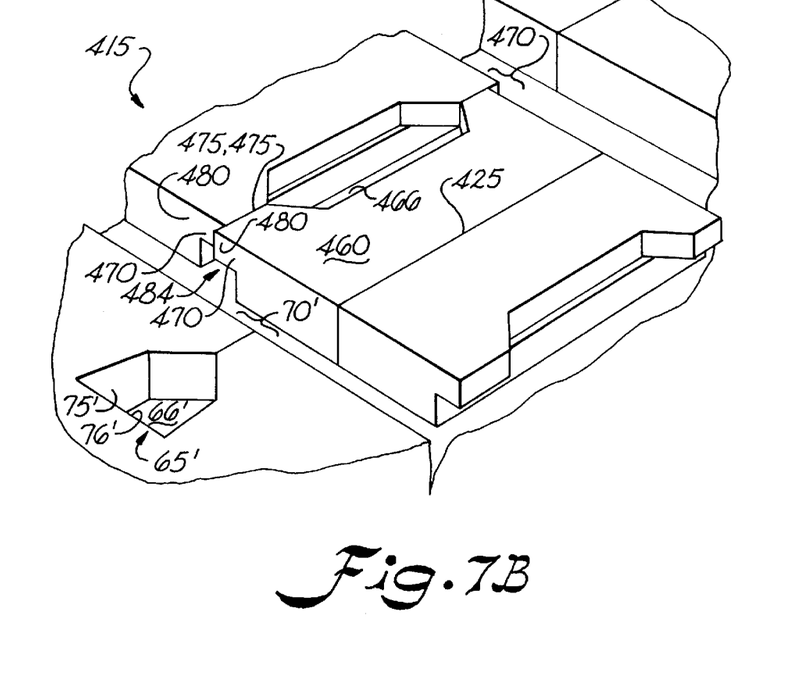
FIG. 7B is a perspective view of the portion of the tire of FIG. 7A when the tire portion is rolling against the ground in the contact patch.
Figure 7C:
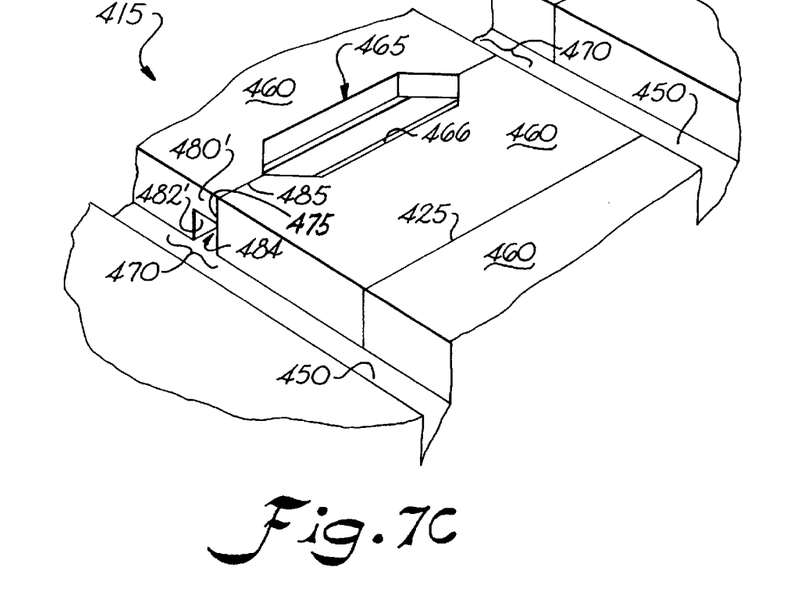
FIG. 7C is a perspective view of a portion of a variation of the alternative embodiment of a tire according to the invention and showing the portion of the tire in contact with a ground surface in the contact patch.

FIGS. 7A–7C are perspective views of a portion of an alternative embodiment of a tire having improved wet traction according to the invention. A rubber tread 415 has a raised tread surface for contacting the ground on which the tire will roll and has at least one, but typically a plurality of, major grooves 450 recessed radially inward for the tread surface and extending generally circumferentially thereabout. Major grooves 450 may have curved walls as shown, for example, in the different embodiment illustrated in FIG. 1, parallel co-planar walls, as shown in, for example, in FIG. 3, or parallel non-co-planar walls, as shown in the additional alternative embodiment of a tire shown in FIGS. 8A, 8B.

When the tire is rolling against the ground, water may flow in a circumferential direction through major groove 450. The straighter that major grooves 450 are, i.e., the more they are "see through", the greater the ability of water to flow through major grooves 450. Rubber tread 415 also has at least one minor groove 465 recessed radially inwardly from the tread surface for directing water or an aqueous mixture such as water and snow or water and ice to the major groove 450 and, additionally, for the carrying of water or snow away from the contact patch in a manner similar to the transport of water by a waterwheel. As with major grooves 450, there will typically be a plurality of minor grooves 465.

Minor grooves 465 are also known to those skilled in the art as transverse or lateral grooves. Minor grooves 465 will have at least one end of exit 470 that intersects a major groove 450. The portions of raised tread between major and minor grooves form blocks 460. The surfaces of blocks 460 comprise the raised tread surfaces of the tire. Blocks 460 have conventional sipes 425 therein. Minor grooves 465 are defined and blocks 460 are circumferentially spaced apart, by radially inwardly recessed voids 466, which are laterally spaced from major grooves 450, and an at least partially closeable exit 470 at the points where minor grooves 465 intersect major grooves 450.

At least partially closeable exit 470 acts as a communicating portion for selectively communicating void 466 and the major grooves 450 for the flow of water therebetween. That is, when at least partially closeable exit 470 is open (water flow disposition), fluid may flow between void 466 and major groove 450. When partially closeable exit 470 is partially closed (restricted disposition), fluid flow between void 466 and major groove 450 is at least reduced or restricted from the open (water flow) disposition. Due to the flexibility within the rubber making up the tire and blocks 460, themselves, the rolling of the tire along the ground causes opposing blocks 460 on each side of a minor groove 465 to move relative to one another in the circumferential direction to at least partially close exit 470, placing said communicating portion in the restricted disposition, thereby at least reducing or restricting the amount of flow of fluid between void 466 and major groove 465. When the at least partially closeable exit 470 comprises a fully closeable exit, as in, for example, in the embodiment shown in FIGS. 2G & 2H, when the exit 470 is closed, fluid flow between void 466 and major groove 465 is entirely prevented. Alternately, with the addition of a circumferential gap 484 in the closed exit 470, as illustrated in FIGS. 7B & 7C, the fluid flow is only reduced or partially restricted.

Figure 8A:
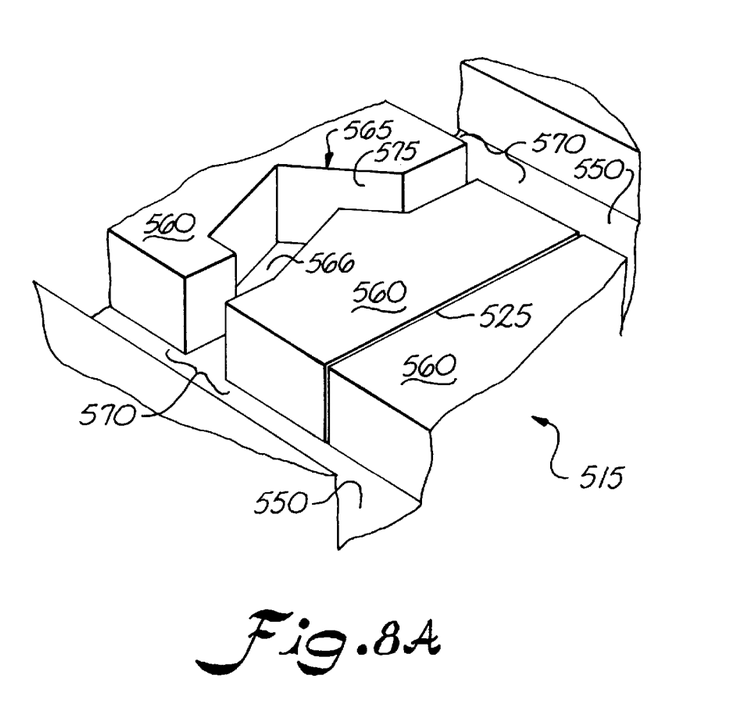
FIG. 8A is a perspective view of a portion of an additional alternative embodiment of a tire having improved wet traction according to the invention.
Figure 8B:
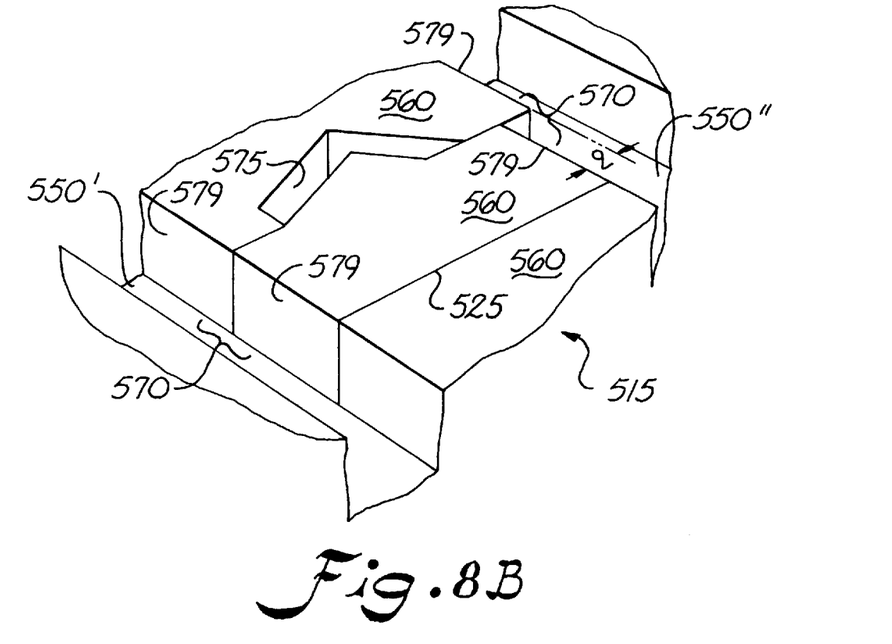
FIG. 8B is a perspective view of the tire portion of the tire of FIG. 8A when the tire is rolling against the ground.

FIGS. 8A–8B are perspective views of a portion of an additional alternative embodiment of a tire having improved wet traction according to the invention. A rubber tread 515 has a raised tread surface for contacting the ground on which the tire will roll and has at least one, but typically a plurality of, major grooves 550 recessed radially inward for the tread surface and extending generally circumferentially thereabout. Major grooves 550 may have curved walls as shown, for example, in the different embodiment illustrated in FIG. 1, parallel co-planar walls, as shown in, for example, in FIG. 3, or parallel non-co-planar walls, as shown in the additional alternative embodiment of a tire shown in FIGS. 8A, 8B.

When the tire is rolling against the ground, water may flow in a circumferential direction through major groove 550. The straighter that major grooves 550 are, i.e., the more they are "see through", the greater the ability of water to flow through major grooves 550. Rubber tread 515 also has at least one minor groove 565 recessed radially inwardly from the tread surface for directing water or an aqueous mixture such as water and snow or water and ice to the major groove 550 and, additionally, for the carrying of water or snow away from the contact patch in a manner similar to the transport of water by a waterwheel. As with major grooves 550, there will typically be a plurality of minor grooves 565.

Minor grooves 565 are also known to those skilled in the art as transverse or lateral grooves. Minor grooves 565 will have at least one end of exit 570 that intersects a major groove 550. The portions of raised tread between major and minor grooves form blocks 560. The surfaces of blocks 560 comprise the raised tread surfaces of the tire. Blocks 560 have conventional sipes 525 therein. Minor grooves 565 are defined, and blocks 560 are circumferentially spaced apart, by radially inwardly recessed voids 566, which are laterally spaced from major grooves 550, and an at least partially closeable exit 570 at the points where minor grooves 565 intersect major grooves 560.

At least partially closeable exit 570 acts as a communicating portion for selectively communicating void 566 and the major grooves 550 for the flow of water therebetween. That is, when at least partially closeable exit 570 is open (water flow disposition), fluid may flow between void 566 and major groove 550. When partially closeable exit 570 is partially closed (restricted disposition), fluid flow between void 566 and major groove 550 is at least reduced or restricted from the open (water flow) disposition. Due to the flexibility within the rubber making up the tire and blocks 560, themselves, the rolling of the tire along the ground causes opposing blocks 560 on each side of a minor groove 565 to move relative to one another in the circumferential direction to at least partially close exit 570, placing said communicating portion in the restricted disposition, thereby at least reducing or restricting the amount of flow of fluid between void 566 and major groove 560. When the at least partially closeable exit 570 comprises a fully closeable exit, as in, for example, in the embodiment shown in FIGS. 2G & 2H, when the exit 570 is closed, fluid flow between void 566 and major groove 550 is entirely prevented.

Figure 8C:
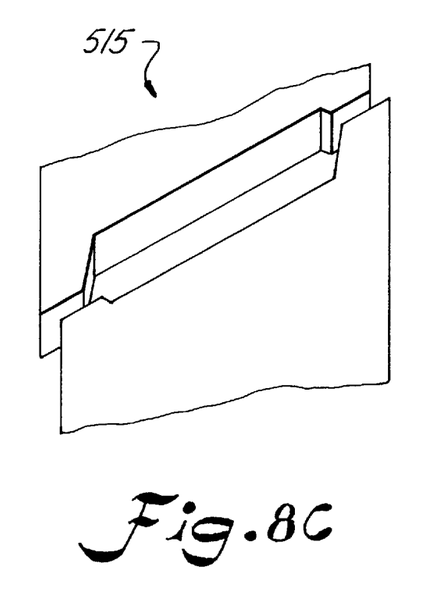
FIG. 8C is a perspective view of a portion of an additional further alternative embodiment of a tire having improved wet traction according to the invention.
Figure 8D:
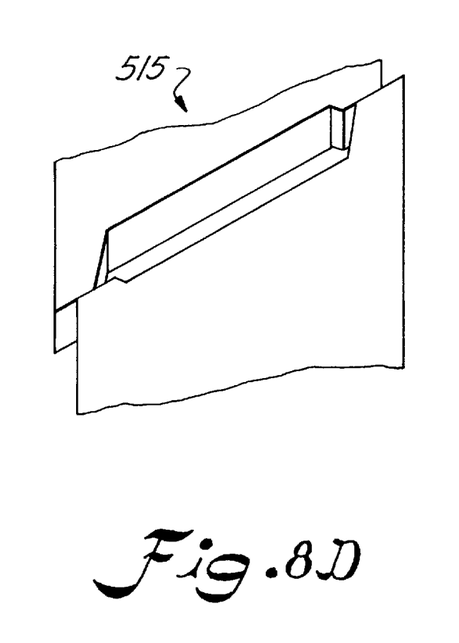
FIG. 8D is a perspective view of the portion of the tire of FIG. 8C in the contact patch when the tire is rolling against the ground.

FIGS. 8C–8D are perspective views of a portion of an additional further alternative embodiment of a tire having improved wet traction according to the invention. A rubber tread 615 has a raised tread surface for contacting the ground on which the tire will roll and has at least one, but typically a plurality of, major grooves (not shown) recessed radially inward for the tread surface and extending generally circumferentially thereabout. Rubber tread 615 also has at least one minor groove 665 recessed radially inwardly from the tread surface for directing water or an aqueous mixture such as water and snow or water and ice to the major groove and, additionally, for the carrying of water or snow away from the contact patch in a manner similar to the transport of water by a waterwheel.

The portions of raised tread between major and minor grooves form blocks such as, for example, a first block 660A and a second block 660B. The surfaces of blocks 660 comprise the raised tread surfaces of the tire. Blocks 660 may have conventional sipes therein. Minor grooves 665 are defined, and the blocks such as blocks 660A and 660B are circumferentially spaced apart, by radially inwardly recessed voids 666, which are laterally spaced from major grooves, and an at least partially closeable exit 670 the points where minor grooves 665 intersect major grooves.

It can be seen in particular in FIG. 8C that each block 660A and 660B includes a pair of projections LP and SP with the projection LP of each block forming a respective exit 670 with the projection SP of the other block. Each projection LP of a respective block extends further circumferentially than the projection SP of the same block. FIG. 8D shows the exits 670 of the blocks 660A and 660B in their respective completely restricted flow dispositions.

Figure 9:
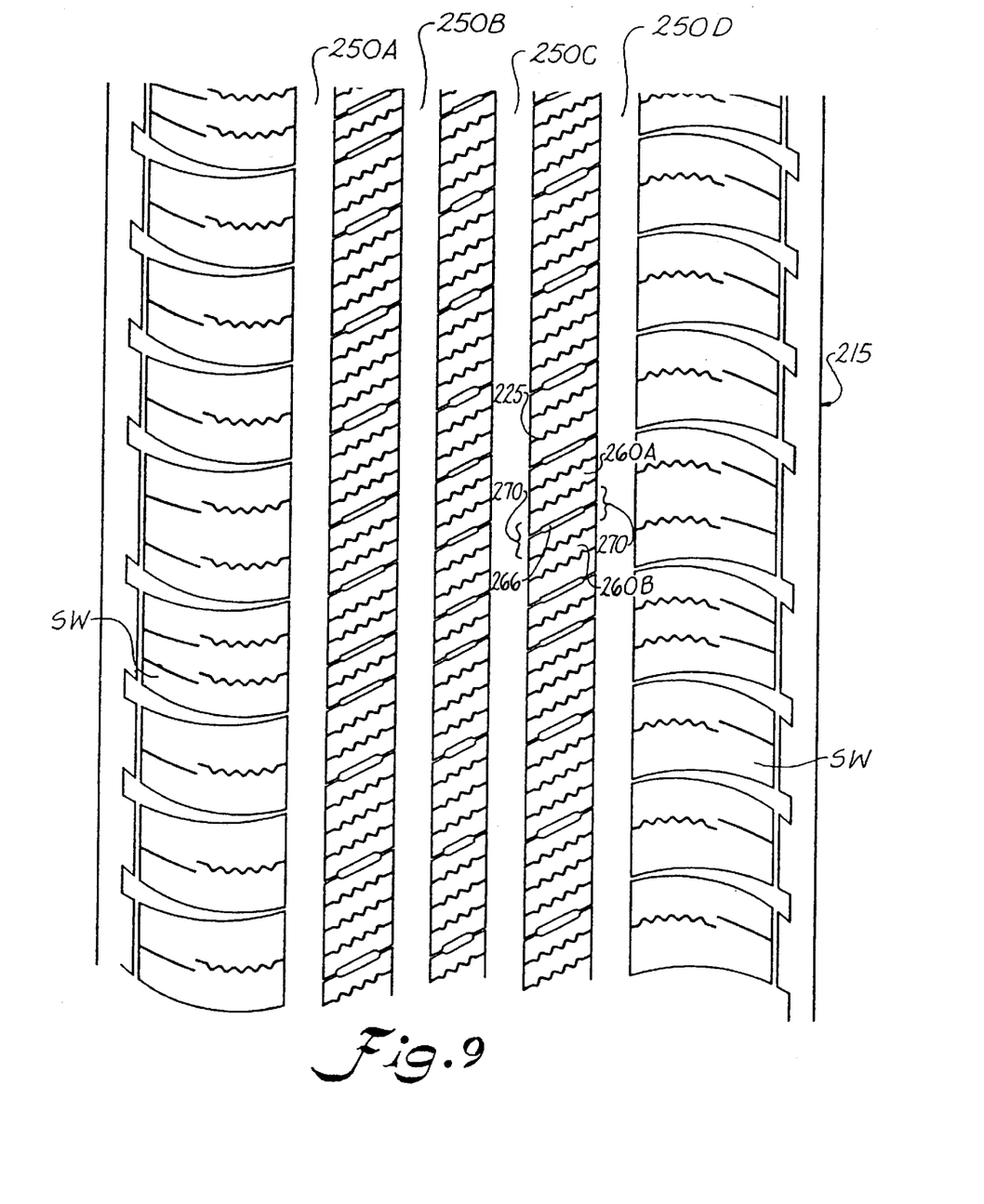
FIG. 9 is a plan view of a portion of the another embodiment of the tire shown in FIG. 2A and showing a plurality of circumferential grooves.

Thus, as seen in FIG. 9, a variation of the another embodiment of the tire shown in FIGS. 2A–2F includes a pair of side walls SW and a tread 215 having a tread surface for contacting a ground surface during rotation of the tire about its axis. The rubber tread 215 has four major grooves 250A, 250B, 250C, and 250D extending in an overall circumferential direction CW around the tire and has surfaces recessed radially inwardly form the tread surface such that fluid may flow in a circumferential direction through the major grooves 250A–D throughout contact of the tread surface with a ground surface GS during rotation of the tire.

Also, the tire includes a first block element 260A and a second block element 260B each forming a portion of the tread surface and spaced circumferentially from one another to define therebetween a void portion 266 recessed radially inwardly from the tread surface and laterally spaced from the major groove. The tire also includes a communicating portion in the form of exit 270 for selectively communicating the void portion 266 and the major groove 250 for the flow of fluid such as water or an aqueous mixture of water, snow, and ice, therebetween. FIG. 9 also illustrates that sipes 225 may have a zigzag shape as opposed to a more curvilinear shape as shown in FIG. 1.

Figure 10A:
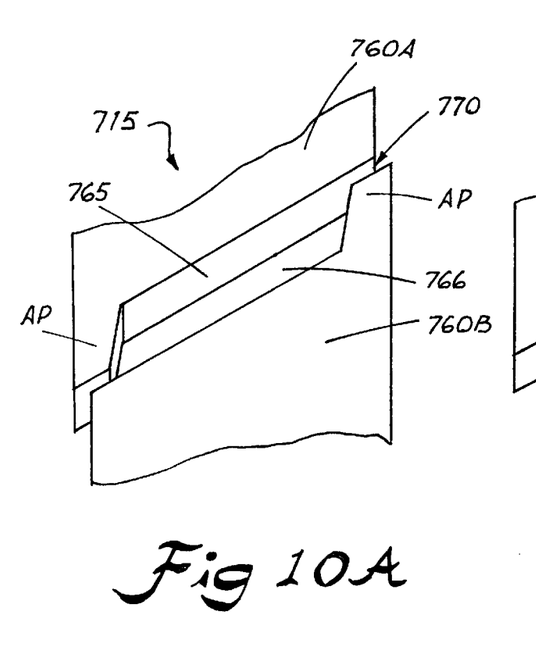
FIG. 10A is a perspective view of a portion of a subsequent alternative embodiment of a tire having improved wet traction according to the invention.
Figure 10B:
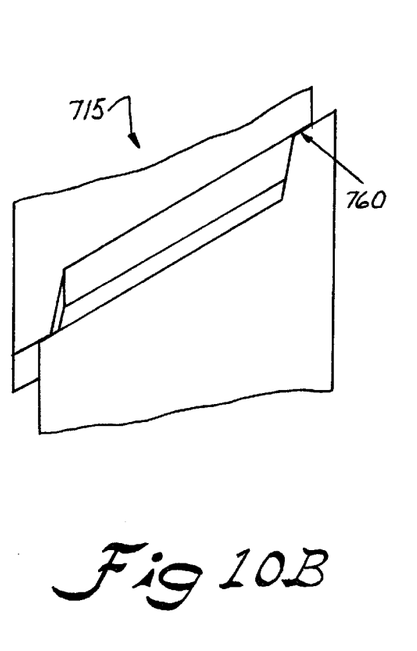
FIG. 10B is a perspective view of the portion of the tire of FIG. 10A in the contact patch when the tire is rolling against the ground.

FIGS. 10A and 10B are perspective views of a portion of an subsequent alternative embodiment of a tire having improved wet traction according to the invention. A rubber tread 715 has a raised tread surface for contacting the ground on which the tire will roll and has at least one, but typically a plurality of, major grooves (not shown) recessed radially inward for the tread surface and extending generally circumferentially thereabout. Rubber tread 715 also has at least one minor groove 765 recessed radially inwardly from the tread surface for directing water or an aqueous mixture such as water and snow or water and ice to the major groove and, additionally, for the carrying of water or snow away from the contact patch in a manner similar to the transport of water by a waterwheel.

The portions of raised tread between major and minor grooves form blocks such as, for example, a first block 760A and a second block 760B. The surfaces of blocks 760 comprise the raised tread surfaces of the tire. Blocks 760 may have conventional sipes therein. Minor grooves 765 are defined, and the blocks such as blocks 760A and 760B are circumferentially spaced apart, by radially inwardly recessed voids 766, which are laterally spaced from major grooves, and an at least partially closeable exit 770 the points where minor grooves 765 intersect major grooves.

It can be seen in particular in FIG. 10A that each block 760A and 760B includes a projection AP and that one wall segment 775 of each block extends linearly from its projection AP adjacent one end of the block to the other end of the block which has an interface with a major groove. The projection AP of each block forms a respective exit 770 with the linear wall segment 775 of the other block. Each projection AP of a respective block extends further circumferentially than any other portion of the same block. FIG. 10B shows the exits 770 of the blocks 760A and 760B in their respective completely restricted flow dispositions.

As described in the background of the invention above, turbulence, also known as eddy currents, from fluid flowing between major grooves 50 and minor grooves 65 can cause a tire to have poor wet traction ability. Turbulence prevents water from leaving the contact patch area and, accordingly, the water will accumulate until it reaches a level at which hydrodynamic lift forces take over and the tire lifts itself from the ground resulting in hydroplaning. This is highly undesirable. However, with the instant invention, by use of at least partially closeable exit 70, the flow of fluid between major groove 50 and minor groove 65 can at least be reduced, and preferably undesirable turbulence is entirely prevented. This substantially improves upon the wet traction ability of the tire.

As seen, for example, in FIG. 1, minor grooves 65 have opposing walls 75 spanning, typically, from one major groove 50 to another. As seen, for example, in FIGS. 7A and 7B, at least partially closeable exits 470 are defined by portions of opposing walls 475 that are circumferentially spaced apart when the tire is not rolling, e.g., FIG. 7A, and in at least partial contact with each other when the tire is rolling, e.g., FIG. 7B.

Figure 2D:
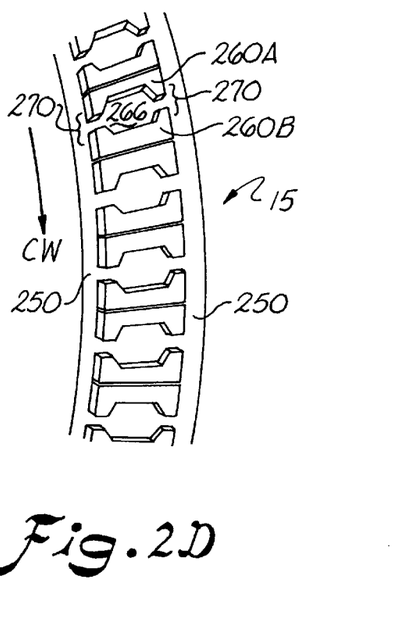
FIG. 2D is a perspective view of a portion of the another embodiment of a tire having improved wet traction according to the invention, the tire portion being shown shortly before entry of the portion into contact with a ground surface and showing the flow or prohibition of water within the various grooves of the tire according to the invention.
Figures 2E, 2G:
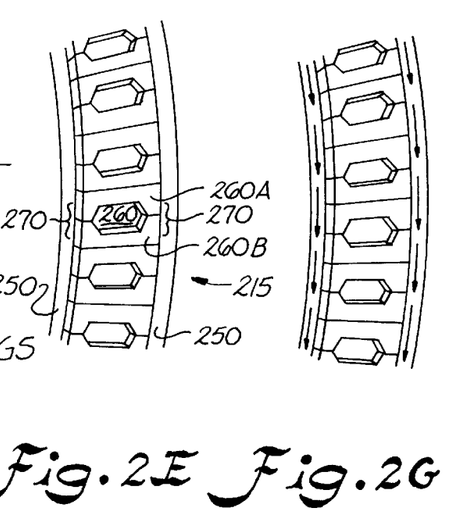
FIG. 2E is a perspective view of the tire portion of the another embodiment of the tire shown in FIG. 2A in the contact patch area in which the tire portion is in contact with a ground surface and showing the flow or prohibition of water within the various grooves of the tire according to the invention.
FIG. 2G is a perspective view of one rib with adjacent major grooves of the tire of FIG. 2E showing the flow in grooves with exits of minor grooves completely restricted.
Figures 5, 6:
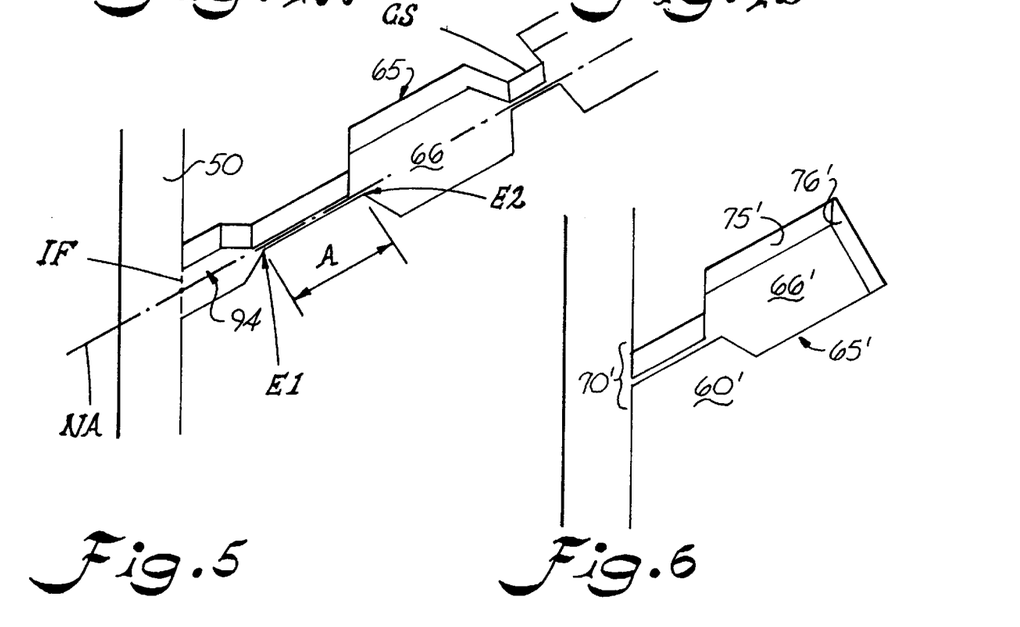
FIG. 5 is a perspective view showing a variation of the exit to the transverse groove in a tire having improved wet traction according to the invention.
FIG. 6 is a plan view showing a variation of the transverse groove in a tire having improved wet traction according to the invention.

Each closeable exit 70 has a closure extent A measured relative to a nominal axis NA of its respective minor groove, as seen in FIGS. 1, 2D, and 5. One end of the closure extent A is defined by that location at which the respective opposing walls of the adjacent first and second block elements contact one another which is most proximate to the interface of the respective minor groove and the respective major groove into which the minor groove communicates. The opposite end of the closure extent A is defined by a location at which the respective opposing walls of the adjacent first and second block elements contact one another which is more proximate to the void of the respective minor groove than is the one end of the closure extent A as measured relative to the nominal axis of the minor groove. For example, as seen in FIG. 2D, the closure extent A of one closeable exit 270 of a minor groove 265 extends from a location E1 at the interface of the minor groove 265 and the major groove 250 into which the minor groove communicates to a location E2 adjacent the void portion 266. As another example, as seen in FIG. 5, the closure extent A of the one closeable exit 70 of the minor groove 65 extends from a location E1 which is proximate to the major groove 50 yet spaced from the interface IF between the minor groove 65 and the major groove 50 relative to a nominal axis NA to a location E2 more proximate the void portion 66 than the location E1. It can also be seen that the location E2 is spaced from a contact support portion CS at which the adjacent block elements are in contact within the void portion 266.

The closure extent A of each closeable exit 70 of a passenger tire preferably extends from about 3 mm to no greater than about one half of the total extent TE of the respective minor groove as measured relative to the nominal axis NA. The total extent TE of a minor groove, as seen for example in FIG. 2D, is preferably between about 15 to 35 mm for a passenger tire having three or four major grooves (i.e., a passenger tire having four to five circumferential series of ribs). Thus, the closure extent A of a closeable exit 70 preferably comprises between about 3 mm/35 mm or about eight (8) percent of the total extent TE of the respective minor groove to about no more than one half of the total extent TE in a passenger tire. However, depending upon the desired tire performance or a tire manufacturing preference, the closure extent A of a closeable exit 70 may be virtually zero—i.e., the respective pair of opposing walls 75 forming the closeable exit 70 may taper to knife edge-like projections which are displaced into contact with one another as the respective block elements forming the closeable exit 70 are in the contact patch.

When each closeable exit 70 is open, the opposing walls 75 forming it at least partially closeable exit 70 are typically circumferentially spaced apart by an average exit thickness B, shown in FIG. 1, which preferably has a value of between 0.5 and 1.2 mm. Each void of a minor groove will typically have an average circumferential thickness C, shown in FIG. 1, as measured as the average distance between opposing walls 75 and C will preferably be of a value of between 2.0 and 6.0 mm. Thus, it can be seen that the ratio of the average exit thickness B to the average width or circumferential thickness C of a given minor groove can range from about eight and one-third percent [8.33%] (e.g., B=0.5 mm and C=6.0 mm) to about sixty percent [60%] (e.g., B=1.2 mm and C=2.0 mm).

As for the height of the opposing walls 75 forming at least partially closeable exit 70, these walls are typically full height, i.e., reaching from the bottom of major groove 50 or minor groove 65 to the tread surface.

Minor grooves 65 may have various configurations. For example, as shown in FIGS. 8A (open) and 8B (closed), each of opposing walls 575 may take a chevron-like shape. When this at least partially closeable exit 570 is closed, the chevron of one wall fits within the chevron of the other wall. Alternatively, as shown in, for example, FIG. 1, each of opposing walls 75 may comprise individual straight wall segments $75^i$, $75^{ii}$, $75^{iii}$, $75^{iv}$, $75^v$ that meet at different obtuse angles. While a configuration of wall segments forming acute angles with one another is not outside the scope of the present invention, such a configuration may be less desirable in certain tire use situations for that reason that road debris may be caught and retained within the acute included angles of the wall segments, thereby fostering conditions in which the debris can penetrate and damage the tire. As yet a further alternative, as shown in FIG. 3, opposing walls 75 may be a mixture of straight $375^{vi}$, $375^{viii}$ and curved $375^{vii}$ wall segments. Thus, it can be seen that the shape of minor groove 65 may be any shape conducive to the channeling of water therethrough to the major grooves.

When at least partially closeable exit 70 does not fully close, as shown in FIGS. 7A (open) and 7B (partially closed) the portions of opposing walls 475 that form at least partially closeable exit 470 may comprise opposing cantilevered upper tab portions 480 that are moved into contact with each other when the tire is rolling against the ground and lower portions 482 that form circumferential gap 484 between each other and are not moved into contact with each other when the tire is rolling. It is also possible, however, that as shown in FIG. 7C, the portions of opposing walls 475 that form at least partially closeable exit 470 may comprise a single cantilevered tab 480' protruding out of one of opposing walls 475 and a tab contacting portion 485 unitary with the other of opposing walls 475. In this embodiment, when the tire rolls against the ground, tab 480' is moved into contact with tab contacting portion 485.

As shown in FIGS. 6, 7A, 7B, minor groove 65' may have only a single exit 70'. When minor grooves 65' have only a single exit 70', a solid wall 76' interconnects opposing walls 75' and defines void 66'. Accordingly, minor groove 65' will be entirely within a single block 60'. While FIGS. 6, 7A, 7B, show a polygonal void 66', void 66' may have any shape, within the parameters discussed above, e.g., the preference for obtuse angles. When a tire having minor groove 65' is rolling against the ground, the flexing of opposing walls 75' of single block 60' will at least partially close exit 70', as described with respect to the other embodiments.

However, minor grooves 65 typically span from one major groove 50 to another, as shown in the bulk of the Figures. Accordingly, as exemplified in FIGS. 2A–I, minor groove 265 will have a second end defined by a second at least partially closeable exit at the second end, and which operates in the same manner as the exit at the first end, i.e., the flexing of circumferentially spaced-apart blocks 60 bringing portions of opposing walls 275 into at least partial contact with each other. The second at least partially closeable exit may comprise a fully closeable exit, such that when the first and second exits are closed, fluid between voids 266 and major grooves 250 is entirely prevented.

The point at which opposing walls 75 contact each other to form at least partially closeable exit 70 may also be varied while still being within the scope of the invention. Typically this contact point will be located at least approximately at the ends of opposing walls 75. Preferably, however, as shown in most of the Figures and will be the case in most instances, this contact point will be located at the very ends of opposing walls 75 to completely eliminate any possible fluid turbulence from intermingling fluid flows, or changes in fluid flow direction caused by fluid flow diversion from major groove 50. In this preferred configuration, each outer wall 480' of at least partially closeable exit 470 is co-planar with the walls 479 that define block 460 to which that outer portion 479 is associated. E.g., FIG. 7A. However, as can be seen by Applicant's use of the term approximately, there is still room for variation. As shown in FIG. 5, "approximately" means that the contact point may be located a small distance inside from the ends of walls 75, i.e., spaced laterally towards void 66, forming a small recessed area 94 between major groove 50 and the contact point. The contact point may be moved in only so far as to not cause an undue amount of turbulence from fluid in major grooves 50 entering and swirling into recessed area 94.

Typically, all outer walls 79 will be both parallel and co-planar. Thus, major grooves 50 will have parallel walls a constant distance apart. This is exemplified by major groove 550' of FIG. 8B. However, it is possible that while still being parallel, outer walls 79 need not be co-planar, as shown with respect to major groove 550'' of FIG. 8B. With such grooves, 550'', its walls are not a constant distance apart as shown by the lateral offset q between walls 579. However, walls 579 will not be so non-co-planar, i.e., laterally offset as to defeat the turbulence reducing purposes of the invention.

Figure 4A:
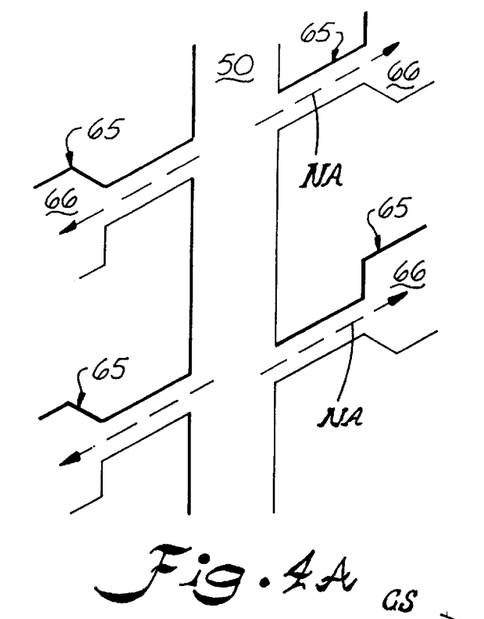
FIG. 4A is a plan view showing a variation of the alignment of the transverse grooves in a tire having improved wet traction according to the invention.
Figure 4B:
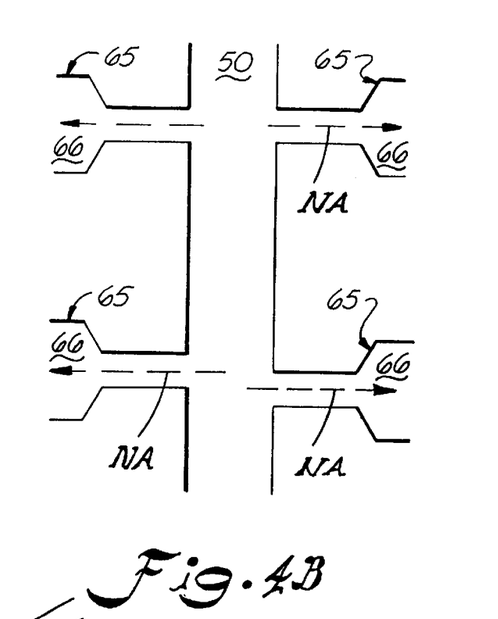
FIG. 4B is a plan view showing a variation of the alignment of the transverse grooves in a tire having improved wet traction according to the invention.

Minor grooves 65 intersect major grooves 50. The angle at which they intersect can vary. For example, in situations in which noise from air trapped in voids 66 is not an issue, the angle may be in the area of 90°, as shown in FIG. 4B. However, in passenger car applications, where design optimization may be favored by reducing the noise which results from air expelled or "piped" from grooves, sipes, and other surface recessed features, the angle may be between 75° and 45°, and preferably 60°, as measured according to the direction of rotation of the tire, and as shown in FIG. 4A.

When there are minor grooves 65 on each side of major groove 50, two configurations for minor grooves 65 are possible. First, the nominal or longitudinal axes NA of each minor groove 65 can be coincident, as shown in the top portions of FIGS. 4A, 4B. Alternatively, the longitudinal axes of each minor groove 65 may be offset as shown in the bottom portions of FIGS. 4A, 4B. The decision to provide an arrangement in which some or all of the minor grooves are offset relative to minor grooves in neighboring block elements will likely be governed by the design importance of noise optimization. Likewise, noise optimization will influence the parameters of the groove offset arrangement such as, e.g., the frequency and degree of the offset.

The above description is given in reference to a tire with improved wet traction. However, it is understood that many variations are apparent to one of ordinary skill in the art from a reading of the above specification and such variations are within the spirit and scope of the instant invention as defined by the following appended claims.

I claim:

1. A tire comprising:
    a tread portion;
    at least one circumferential rib having a plurality of tread elements, said rib being defined between circumferential major grooves extending generally circumferentially around said tread portion;

each one of said tread elements being defined between two minor grooves, each one of said minor grooves having a first end and a second end, said first and second ends intersecting a respective major groove, said minor groove being narrower than said major groove, said minor groove being defined by a void and an exit at each one of said first and said second ends, such that, when a respective exit is open, fluid may flow between said void and said respective major groove and, when said respective exit is closed, fluid flow between said void and said respective major groove is restricted;

said minor grooves each defined by circumferentially spaced apart opposing walls;

said voids each with an average void width C, measured as the average circumferential distance between said opposing walls in said void, between 2.0 and 6.0 millimeters;

said exits of said respective minor groove each defined by exit portions of said opposing walls that are circumferentially spaced apart an average exit width B when said tread portion is not in ground contact and said average exit width B, measured as the average circumferential distance between said opposing walls in said exit being between 0.5 and 1.2 mm;

said exits each having a length defined between said void of said minor groove and said major groove; whereby rolling said tire against the ground circumferentially closes said exit; and said tread elements each having at least one sipe therein.

2. The tire according to claim 1, wherein said length of said portions of said opposing walls forming said exit is about 3 mm.

3. The tire according to claim 1, wherein each of said opposing walls defining said void have an angular bend therein, such that when said exit is closed, the angular bend of one wall fits within the angular bend of the other wall.

4. The tire according to claim 1, wherein each one of said major grooves is defined by opposed generally parallel walls, wherein an outer portion of said each minor groove at a respective exit is co-planar with one of said opposed generally parallel walls of said major groove.

5. The tire according to claim 1, wherein each of said opposing walls defining said void comprise individual straight wall segments that meet at angles.

6. The tire according to claim 1, wherein each of said opposing walls defining said void are curved.

7. The tire according to claim 1, wherein said at least one circumferential rib includes a first rib and a second rib including said minor grooves, each one of said exits of said minor grooves of said first rib has a first nominal axis and each one of said exits of said second rib has a second nominal axis, wherein said first and second nominal axes intersect said one of said major grooves at an angle.

8. The tire according to claim 7, wherein each one of said nominal axes intersects one of said major grooves at an angle of 90°.

9. The tire according to claim 7, wherein each one of said nominal axes intersects one of said major grooves at an angle of between 75° and 45°.

10. The tire according to claim 7, wherein each one of said nominal axes intersects one of said major grooves at an angle of 60°.

11. The tire according to claim 7, wherein said nominal axes of said exits of said minor grooves of said ribs are coincident with one another.

12. The tire according to claim 7, wherein: said nominal axes of said exits of said minor grooves of said ribs are circumferentially offset with respect to one another.

13. The tire according to claim 1, wherein said tread portion includes a tread surface;

at least one major groove is of a uniform depth radially inward from said tread surface and has a groove bottom; and said exit spans said entire depth between said bottom of said major groove and said tread surface.

14. The tire according to claim 1, wherein said length of said closeable exit is from about 3 mm to no greater than about one half of the total extend of the respective minor groove as measured relative to a nominal axis of said minor groove.

* * * * *